United States Patent
Collins et al.

(10) Patent No.: US 6,379,281 B1
(45) Date of Patent: Apr. 30, 2002

(54) ENGINE OUTPUT CONTROLLER

(75) Inventors: Brett Denton Collins, Ypsilanti; Ibrahim Haskara, Brownstown; Lawrence A. Mianzo, Plymouth; Stephen De La Salle, Saline, all of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 106 days.

(21) Appl. No.: 09/657,991

(22) Filed: Sep. 8, 2000

(51) Int. Cl.$^7$ .............................................. B60K 41/04
(52) U.S. Cl. ....................................... 477/107; 477/110
(58) Field of Search ................................. 477/107, 110, 477/111, 902; 701/55, 56

(56) References Cited

U.S. PATENT DOCUMENTS 4,846,021 A * 7/1989 Hamano et al. ............... 74/866
5,899,286 A * 5/1999 Yamaguchi ................ 180/65.3

* cited by examiner

*Primary Examiner*—Sherry Estremsky
*Assistant Examiner*—Tisha D. Lewis
(74) *Attorney, Agent, or Firm*—John E. Kajander

(57) ABSTRACT

An engine output control method for a vehicle having a drive by wire engine system responsive to a desired engine torque signal. The method comprises the steps of generating a driver demanded acceleration value corresponding to an accelerator pedal position input, and generating a gear value as a function of a vehicle speed value and the driver demanded acceleration value. The method also derives a driveline torque demand comprising an inertial model torque value of the vehicle driveline corresponding to the driver demanded acceleration and the gear value, and a dynamic transmission model torque value for the gear value. The resulting torque demand is then passed through an inverse torque converter model to generate a demanded engine torque. The resulting demanded engine torque value is then used to control the engine output. In this way, the present method accounts for the transmission and driveline dynamics in an acceleration-based engine control scheme.

17 Claims, 2 Drawing Sheets

ENGINE OUTPUT CONTROLLER

BACKGROUND OF THE INVENTION

The invention relates generally to control systems for internal combustion engines, and more particularly, concerns a powertrain controller for drive by wire vehicles.

For "drive by wire"-equipped vehicles such as an electronic throttle control-equipped vehicle or variable valve timing-equipped vehicle, it is necessary to interpret driver demand and convert it to an appropriate engine control command to deliver the desired engine/vehicle response. For example, in a torque-based scheme, driver demand, as determined by the accelerator pedal input, is typically converted to a desired torque at the drive wheels. The desired torque of the wheels is then translated back to a desired engine torque using the steady-state gear ratio. Using the steady-state driveline gear ratio, however, ignores acceleration and shift transients in the driveline. It also does not account for the torques applied by the various clutches and band friction elements in the transmission and driveline. As a result, drivability may be compromised. In addition, extensive calibrating or "tuning" of controller parameters is usually required to provide acceptable performance. Accordingly, there is a need for an improved powertrain output controller.

SUMMARY OF THE INVENTION

Accordingly, it is an object of the present invention to provide an improved powertrain output controller.

According to the present invention, the foregoing and other objects and advantages are attained by an engine output control method for a vehicle having a drive by wire engine system responsive to a desired engine torque signal. The method comprises the steps of generating a driver demanded acceleration value corresponding to an operator input, and generating a gear value as a function of a vehicle speed value and the driver demanded acceleration value. The method also derives a driveline torque demand comprising an inertial model torque value of the vehicle driveline corresponding to the driver demanded acceleration and the gear value, and a dynamic transmission model torque value for the gear value. The resulting torque demand is then passed through an inverse torque converter model to generate a demanded engine torque. The resulting demanded engine torque value is then used to control the engine output. In this way, the present method accounts for the transmission and driveline dynamics in an acceleration-based engine control scheme.

An advantage of the present invention is that it provides an improved powertrain output controller which accounts for transmission and driveline dynamics. Another advantage of the present invention is that it reduces the calibration effort of the engine controller and improves performance.

Other objects and advantages of the invention will become apparent upon reading the following detailed description and appended claims and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of example to the invention. In the drawings.

DETAILED DESCRIPTION OF THE PREFERRED EMBODIMENT

Figure 1:
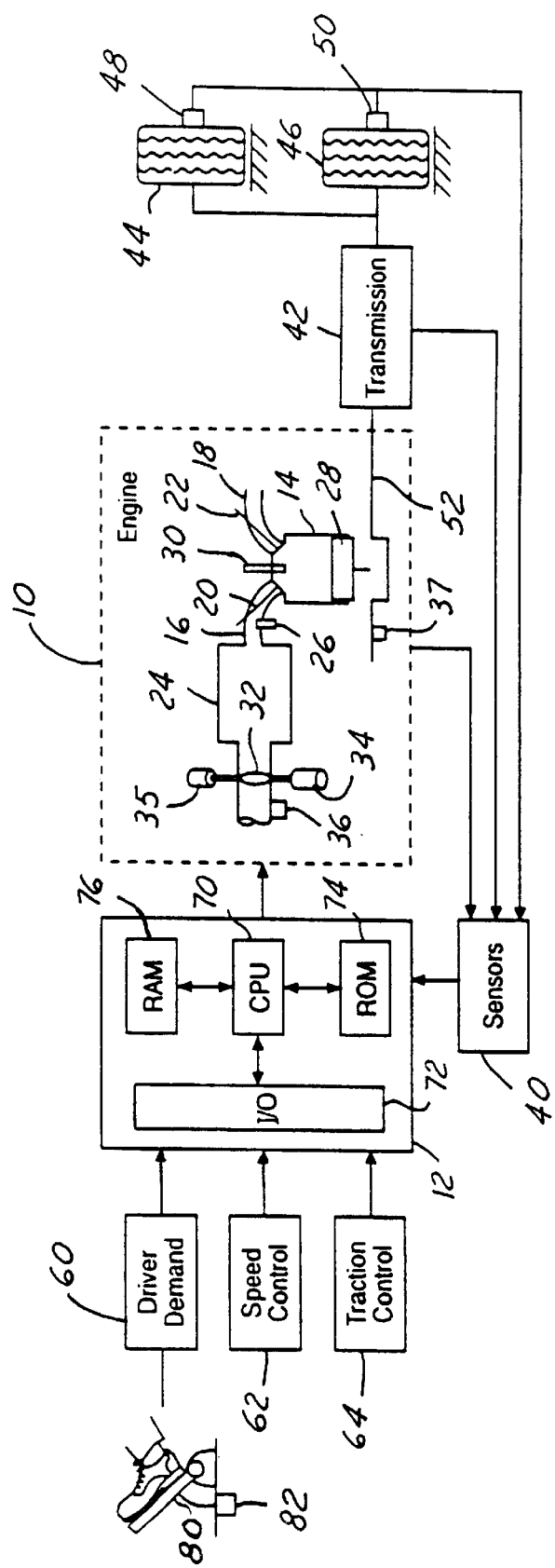
FIG. 1 is a schematic diagram of an internal combustion engine and associated control system according to one embodiment of the present invention.

Turning first to FIG. 1, there is shown a schematic diagram of an internal combustion engine 10 and associated engine controller 12 in accordance with one embodiment of the present invention. The engine 10 includes a plurality of combustion chambers 14, one of which is shown. Each combustion chamber 14 has an associated intake 16 and exhaust 18 operated by a respective valves 20, 22. Valves 20, 22 may be electronically controlled to allow variable valve timing. Combustion occurs as a result of the intake of air and fuel from the intake manifold 24 and fuel injector 26 respectively, compressioned by the piston 28 and ignitioned by the spark plug 30. Combustion gases travel through the exhaust manifold 18 to the downstream catalytic converter (not shown) and are emitted out of the tailpipe. A portion of the exhaust gases may also be recirculated back through the intake manifold 24 to the engine cylinders 14 by way of an EGR valve (not shown).

The engine 10 is a drive by wire-controlled engine including an electronic throttle, thus, the airflow through the intake manifold 24 is controlled by a throttle comprising a throttle plate 32 and throttle actuator 34. A throttle position sensor 35 measures the actual throttle position. A mass airflow (MAF) sensor 36 measures the amount of air flowing into the engine 10. An engine speed sensor 37 provides a value indicative of the rotational speed of the engine 10. Further, additional sensors are represented by block 40 which provide feedback to the engine controller 12 relating to the status of the engine 10 transmission 42 and wheels 44, 46. Controller 12 receives various signals such as a first measurement of vehicle speed of wheel 44 from sensor 48, a second measurement of vehicle speed of wheel 46 from sensor 50, measurement of vehicle acceleration from an accelerometer (not shown) as well as various other signals from sensors such as engine coolant temperature (ECT), barometric pressure (BP), air charge temperature (ACT), and manifold pressure (MAP).

Although the engine shown in FIG. 1 is equipped with an electronic throttle system, the present engine control scheme is equally applicable to other drive by wire engine systems including engines having electronically controlled variable valve timing (with or without a throttle system) and electronically controlled diesel engines.

Transmission 42 is coupled to the crankshaft 52 of engine 10 and a first set of drive wheels 46. In addition, to provide all wheel drive, transmission 42 can also be coupled to a second set of drive wheels 44. Transmission 42 can be a combined gear set and torque converter, a manual transmission, automatic transmission, a continuously variable transmission, or any other power transfer unit known to those skilled in the art and suggested by this disclosure.

Continuing with FIG. 1, in addition to receiving various signals from sensors, controller 12 also receives inputs from the driver demand system 60, speed control system 62 and the traction control system 64. Controller 12 is a conventional microcomputer including a microprocessor unit 70, input/output ports 72, electronically programmable memory 74, random access memory 76, and a conventional data bus.

The present system is, preferably, acceleration-based. Thus, the driver demand system 60 interprets the operator's requested engine output by monitoring the position of the accelerator 80 by pedal position sensor 82. The pedal position value as measured by the sensor 82 is communicated to the driver demand system 60 and a desired vehicle acceleration is generated and communicated to the controller 12. Of course, the operator input could be derived from inputs other than the accelerator pedal. If active, the speed control system 62 also communicates a desired vehicle acceleration to the controller 12 to maintain the vehicle speed at that desired by the operator. Traction control system 64 also monitors wheel slip and/or vehicle acceleration to limit the engine output power accordingly and generates a desired vehicle acceleration value to prevent wheel slip. The controller 12 receives the vehicle acceleration request and uses a dynamic transmission/driveline model to translate the desired vehicle acceleration request into a demanded engine torque value. The controller then commands the appropriate airflow, fueling rate, spark and valve timing to achieve the desired engine output torque.

Figure 2:
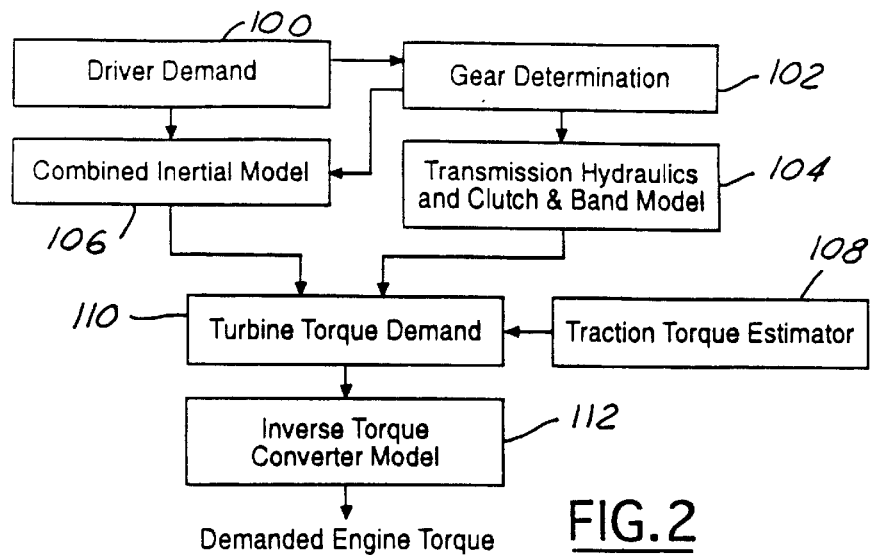
FIG. 2 is a block diagram of one embodiment of the controller of FIG. 1.

FIG. 2 shows a block diagram of one embodiment of the controller 12 of FIG. 1. The control method of FIG. 2 uses desired vehicle acceleration instead of desired wheel torque as the primary control parameter. A dynamic model of the transmission including clutch and band models as well as a traction torque estimator is used to generate the desired engine torque value. In the present method, shift transients, changes in vehicle acceleration, and changes in vehicle and driveline inertia are compensated for. The control scheme of FIG. 2 is for a planetary gear set automatic transmission with a pre-determined shift schedule.

Referring to FIG. 2, in block 100, the driver demanded vehicle acceleration is determined. This is preferably generated by a predetermined map of driver demand as a function of accelerator pedal position input and rate of change. The resulting driver demand is communicated to the gear determination in block 102 or shift logic. The gear determination uses a pre-determined shift schedule along with the desired vehicle acceleration from the driver demand block 100 as well as the actual vehicle speed from a vehicle speed sensor to determine the desired gear. The gear determination from block 102 is then communicated to the transmission hydraulics and clutch and band model in block 104. In block 104, the torque generated by the clutch and band in transmission hydraulics is determined using the following models:

For a brake band:

$$T_{Band} = P \cdot A_B \cdot R_B \cdot (e^{\mu(\omega_B)\theta_B} - 1) sgn(\omega_B) \quad (1)$$

Where $T_{Band}$ is the band torque, P is the hydraulic pressure, $A_B$ is the band area, $R_B$ is effective radius of the band, $\mu(\omega_B)$ is the dynamic coefficient of friction, $\omega_b$ is the angular velocity of the band, and $\theta_B$ is the band warp angle.

For a clutch:

$$T_{Clutch} = P \cdot A_C \cdot R_C \cdot \mu(\omega_C) sgn(\omega_C) \quad (2)$$

Where $T_{Clutch}$ is the clutch torque, $A_C$ is the clutch area, $R_C$ is the clutch effective radius, $\mu(\omega_C)$ is the coefficient of friction, and $\omega_C$ is the angular velocity between clutching elements. The values of the clutch and band model will change depending upon the gear or state of the transmission.

The driver demanded vehicle acceleration is also input along with the gear determination into a combined inertia of model in block 106. The combined inertia value is calculated from the planetary gear set components, i.e., the number of gear teeth, gear inertia, etc., for each gear and transmission state. This number is then multiplied with the demanded vehicle acceleration to derive the combined inertia.

In block 108, the traction torque due to the tire-road interaction is determined. The traction torque estimator 108 uses the actual vehicle speed and a model of the vehicle dynamics to determine the traction torque from the road input. The vehicle dynamics can be represented mathematically as follows:

Vehicle Dynamics $$\omega_{OS} = \omega_R \quad (3)$$

$$\alpha_{OS} = \alpha_R \quad (4)$$

$$T_{OS} = T_R - J_{OS}\alpha_R \quad (5)$$

$$\omega_{OS} = R\omega_{wheel} \quad (6)$$

$$RT_{OS} = T_{wheel} - J_{axle}\alpha_{wheel} \quad (7)$$

$$T_{wheel} = T_{traction} - J_{vehicle}\alpha_{wheel} \quad (8)$$

$$T_R = \frac{T_{traction}}{R} + \left(J_{OS} + \frac{J_{vehicle} + J_{axle}}{R^2}\right)R\alpha_{wheel} \quad (9)$$

Where J is rotary inertia, T is a torque, and α is angular acceleration, $J_{vehicle}$ is the inertia of the vehicle, and $J_{axle}$ is the inertia of the axle, $J_{OS}$ is the inertial of the output shaft, $T_{traction}$ is the traction torque at the wheel, and R is the final drive ratio.

Accordingly, the overall linear vehicle dynamics are described as follows:

$$T_R = \frac{T_{traction}}{R} + \left(J_{OS} + \frac{J_{vehicle} + J_{axle}}{R^2}\right)R\alpha_{wheel} \quad (10)$$

The results from the inertia model in block 106, the transmission model in block 104, and the traction torque model in block 108 and them summed in block 110 to generate a turbine torque demand value. The turbine torque demand value from block 110 is then communicated to block 112 where it is processed through an inverse torque converter model to drive the demanded engine torque to control the engine output. For the planetary gear set automatic transmission control system of FIG. 2. The equations for the first and second gear are as follows:

First Gear:

$$\frac{n_R}{n_{FS}} T_T = \frac{T_{traction}}{R} + \frac{n_R}{n_{RS}} \frac{n_{FS}}{n_{RS}} T_{2/AB} + \quad (11)$$

$$\left(J_{OS} + \frac{J_{vehicle} + J_{axle}}{R^2} + J_{FS}\frac{n_R}{n_{FS}}\frac{n_r}{n_{FS}} + \ldots J_R + \frac{n_R}{n_{RS}}\frac{n_R}{n_{RS}}J_{RS}\right)$$

$$R\alpha_{wheel}$$

Second Gear:

$$\frac{n_R}{n_{FS}}\frac{n_{RS}}{n_{RS}} + \frac{n_{FS}}{n_R} T_T = \frac{T_{traction}}{R} + \frac{n_R}{n_r + n_{RS}}\frac{n_{FS}}{n_{RS} + n_{FS}} \quad (12)$$

$$T_{OWC2}\left(J_{OS} + \frac{J_{vehicle} + J_{axle}}{R^2} + \ldots \left(\frac{n_R}{n_{FS}}n_{RS} + \frac{n_{FS}}{n_{RS} + n_R}\right)^2 J_{FS} + \right.$$

$$\left. \frac{n_R}{n_{RS} + n_R}\frac{n_R}{n_r + n_{RS}}J_{PC} + J_R\right)R\alpha_{wheel}$$

where FS is the forward sun, R is the ring gear, PC is the planet carrier, and RS is the reverse sun gear, n is the number of teeth of the gear. Additionally, $T_{OWC2}$ is the torque created when the second one-way clutch is applied, $T_{2/4B}$ is the torque when the 2/4 band is applied. The lever analogy was also used to obtain the angular velocity relationships between the different gears as a function of the number of teeth of each gear.

Although FIG. 2 has been described with reference to a planetary gear set automatic transmission, those of skill in the art will appreciate its application to manual transmission equipped vehicles as well.

In addition, the above equations are representative of one example for the first two gears of planetary gear set four-speed automatic transmission. The equations above are intended to be an example of the implementation of the present method. Those of skill in the art will recognize the applicability of the present method to other transmission schemes.

Figure 3:
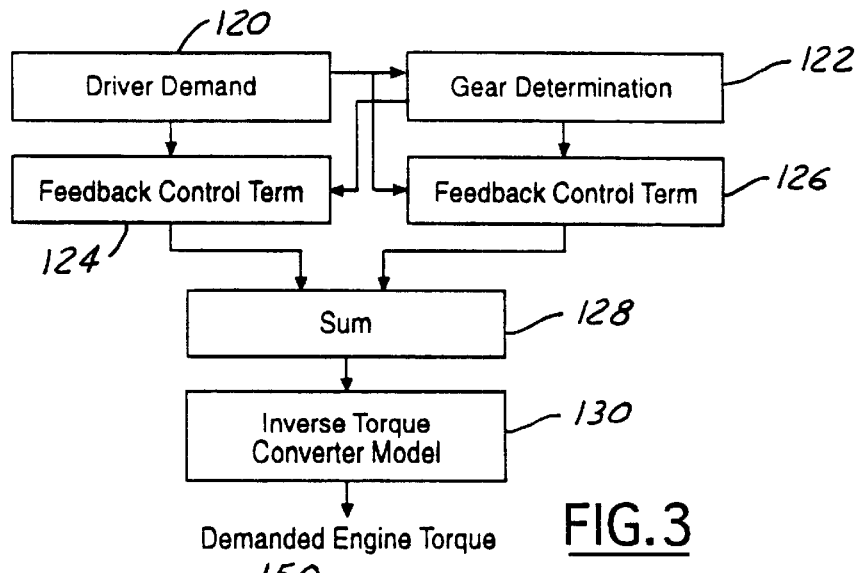
FIG. 3 is a block diagram of another embodiment of the controller of FIG. 1.

FIG. 3 shows a block diagram of another embodiment of the controller 12 of FIG. 1. FIG. 3 shows an implicit control law diagram for a planetary gear set automatic transmission with a pre-determined shift schedule. The term explicit is used herein to indicate that the equations of the model or some inversion of the model appears explicitly in the control term. The term "implicit" as used herein indicates that although a model is used to design the control term, the mathematical model for designing the control scheme generates a control term that does not contain the model itself. The implicit control model uses feedback and feed forward control in cooperation with a dynamic model of the transmission and driveline to determine the demanded engine torque. The control scheme begins in block 120 by interpreting the driver demanded vehicle acceleration. This is the same step as that performed in block 100 of FIG. 2 wherein the operator input as determined from the accelerator pedal position is converted to a vehicle acceleration demand. In block 122, the desired vehicle acceleration demand and the actual vehicle speed as determined by vehicle speed sensor are indexed by a pre-determined shift schedule to generate the desired driveline gear ratio. The driver demand from block 120 and the gear determination from block 122 are both fed into block 124 which develops the feed forward control term. This is the feed forward or open-loop term that estimates the turbine torque demand generated by the driver demand and gear determination. One method of implementing the feed forward control term is to incorporate control blocks 104, 106, 108 and 110 from FIG. 2. Alternatively, this term can be generated by known methods of calibration and engine mapping.

The driver demand and gear determination are also fed to the feedback control term block 126. The feedback control term uses the error signal representing the difference between the desired and actual acceleration values to generate the turbine torque demand. Preferably, the feedback control term is generated at the function of vehicle acceleration, however, the acceleration can alternatively be wheel acceleration or engine acceleration, although some conversion may be necessary. In block 128, the feed forward and feedback control terms are summed and communicated to the inverse torque converter model in block 130. The inverse torque converter model is the same as that described above in control block 112 with respect to FIG. 2. The inverse torque converter model outputs the demanded engine torque value which is used by the engine controller according to known methods to modify the airflow, fueling rate, spark timing, and/or valve timing to achieve the demanded engine torque.

Figure 4:
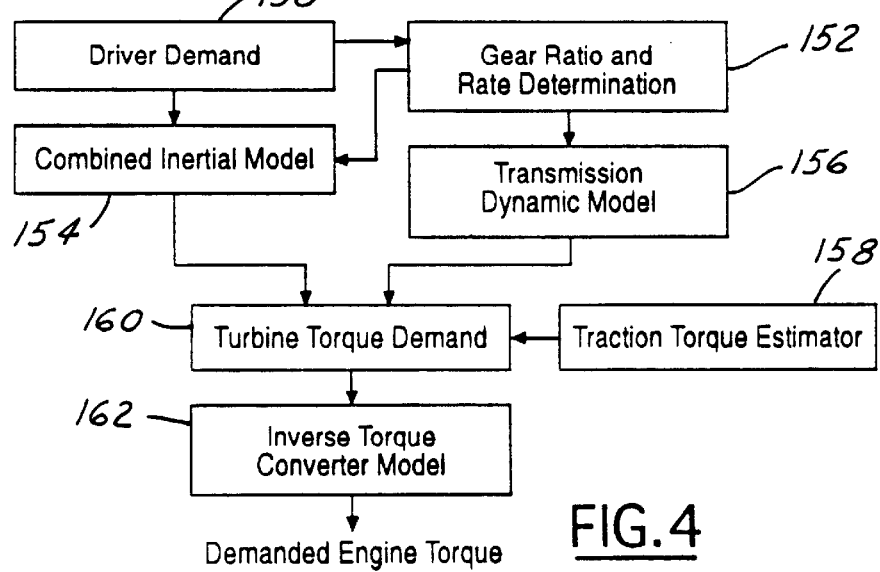
FIG. 4 is a block diagram of another embodiment of the controller of FIG. 1.

FIG. 4 shows a block diagram of another embodiment of the controller 12 of FIG. 1. The control scheme of FIG. 4 is an explicit control scheme which uses a dynamic model of a continuously variable transmission to determine the requested engine torque corresponding to the driver demand input. A pre-determined map of the driver demand is used to obtain a desired acceleration at the wheel from the operator pedal position input and rate of change. The gear ratio and rate of change of gear ratio is determined as well as part of the control logic routine. The traction torque due to the tire-road interaction is also estimated. The demanded engine torque is then generated from the inverse torque converter model and the inputs from the traction torque estimator and the product of the desired vehicle acceleration and drivetrain inertia, and the gear ratio and gear ratio rate of change.

The explicit control scheme for the continuously variable automatic transmission system begins in block 150 by interpreting the acceleration pedal position input and converting it to a vehicle acceleration demand in the same way as control blocks 100 and 120 from FIGS. 2 and 3. In block 152, the gear ratio and rate of change of gear ratio is determined using a pre-determined ratio schedule indexed by the desired acceleration demand and the actual vehicle speed, similarly to the gear determination in control blocks 102 and 122 from FIGS. 2 and 3, although in the case of a continuously variable transmission, this determination block also includes a gear ratio rate of change value.

The driver demand and gear ratio and rate determination are both input to the combined inertial model in block 154. This is similar to the combined inertial model of block 106 of FIG. 2. In this case, however, the combined inertia is calculated from the driveline components and gear ratio, i.e., the driveshaft inertia, CVT component inertia, etc., and is multiplied with the demanded vehicle acceleration.

The gear ratio and rate determination from block 152 is also communicated to the transmission dynamic model in block 156. This model is used to determine the delivered ratio and ratio rate of change. These values are used to calculate or estimate the CVT friction characteristics analogous to the band and clutch losses or torques of the standard transmission. There is also a torque due to the product of engine speed, ratio rate of change, and engine inertia.

The traction torque estimator in block 158 is the same as the traction torque estimator in block 108 of FIG. 2. This estimator uses actual vehicle speed and a model of the vehicle dynamics to determine the traction torque from the road input.

The turbine torque demand in block 150 results from the traction torque estimator 158, the gear ratio and gear ratio rate of change from the transmission dynamic model 156, and the product of the driver demand vehicle acceleration and drivetrain inertia from block 154. This value is then communicated to the inverse torque converter model in block 162 if there is a torque converter model for the driveline. The resulting demanded engine torque would then be generated in a similar matter as described with reference to FIGS. 2 and 3.

From the foregoing, it can be seen that there has been brought to the art a new and improved engine control system for a drive by wire vehicle. While the invention has been described with reference to one or more embodiments, it should be understood that it is not limited to those embodiments. On the contrary, the invention covers all alternatives, modifications, and equivalents as may be included with the spirit and scope of the appended claims.

What is claimed is:

1. An engine output control method for a vehicle having a drive by wire engine system responsive to a desired engine torque signal, the method comprising the steps of:

generating a driver demanded acceleration value corresponding to an operator input;

generating a gear value as a function of a vehicle speed value and said driver demanded acceleration value;

deriving a driveline torque demand comprising an inertial model torque value of said vehicle driveline corresponding to said driver demanded acceleration and said gear value, and a dynamic transmission model torque value for said gear value;

deriving a demanded engine torque value from said driveline torque demand and a torque converter model; and controlling said engine output as a function of said demanded engine torque value.

2. The method of claim 1 wherein the step of deriving a driveline torque demand includes adding a traction model torque value from a vehicle dynamic model and said vehicle speed value.

3. The method of claim 1 wherein the step of generating a gear value includes the step of generating a desired gear ratio value and a gear ratio rate of change value for a continuously variable transmission as a function said vehicle speed value and said driver demanded acceleration value.

4. The method of claim 3 wherein the step of deriving a driveline torque demand includes the step of generating said dynamic transmission model torque value for said gear ratio value and said gear ratio rate of change value.

5. The method of claim 1 wherein the step of generating a driver demanded acceleration value includes the step of retrieving said driver demanded acceleration value from a table of values indexed by an accelerator pedal position input.

6. The method of claim 1 wherein the step of generating a gear value includes the step of retrieving said gear value from a table of values indexed by said driver demanded acceleration value and said vehicle speed value.

7. An engine output control method for a vehicle having a drive by wire engine system responsive to a desired engine torque signal, the method comprising the steps of:

generating a driver demanded acceleration value corresponding to an operator input;

generating a gear value as a function of a vehicle speed value and said driver demanded acceleration value;

deriving a driveline torque demand comprising the sum of a feedforward torque value corresponding to said driver demanded acceleration value and said gear value, and a feedback torque value corresponding to said driver demanded acceleration value, said gear value, and a actual acceleration value;

deriving a demanded engine torque value from said driveline torque demand and a torque converter model; and controlling said engine output as a function of said demanded engine torque value.

8. The method of claim 7 wherein the step of generating a driver demanded acceleration value includes the step of retrieving said driver demanded acceleration value from a table of values indexed by an accelerator pedal position input.

9. The method of claim 7 wherein the step of generating a gear value includes the step of retrieving said gear value from a table of values indexed by said driver demanded acceleration value and said vehicle speed value.

10. A powertrain control system for controlling the operation of a drive by wire internal combustion engine comprising:

a microprocessor and associated memory including a model of the vehicle driveline dynamics and a torque converter model, said microprocessor programmed to:

generate a driver demanded acceleration value corresponding to an operator input;

generate a gear value as a function of a vehicle speed value and said driver demanded acceleration value;

derive a driveline torque demand as a function of said vehicle driveline dynamic model, said driver demanded acceleration value, and said gear value;

derive a demanded engine torque value from said driveline torque demand and a torque converter model; and control said engine output as a function of said demanded engine torque value.

11. The powertrain control system of claim 10 wherein said microprocessor memory includes an inertial model for generating a first driveline torque demand as a function of said demanded acceleration value and said gear value.

12. The powertrain control system of claim 11 wherein said microprocessor memory includes a traction torque model for generating a second driveline torque demand as a function of a vehicle speed value.

13. The powertrain control system of claim 10 further comprising a memory map comprising a table of gear values indexed by said driver demanded acceleration value and a vehicle speed value.

14. The powertrain control system of claim 10 further comprising a memory map comprising a table of gear ratio values and gear ratio rate of change values indexed by said driver demanded acceleration value and a vehicle speed value.

15. The powertrain control system of claim 13 further comprising a memory map comprising a table of driver demanded acceleration values indexed by an accelerator pedal position value.

16. The powertrain control system of claim 14 further comprising a memory map comprising a table of driver demanded acceleration values indexed by an accelerator pedal position value.

17. The powertrain control system of claim 10 wherein said operator input is an accelerator pedal position input.

* * * * *